United States Patent

Nomura et al.

Patent Number: 5,160,759
Date of Patent: Nov. 3, 1992

[54] EDIBLE OIL-IN-WATER EMULSION

[75] Inventors: Masaki Nomura; Shin Koike, both of Ibaraki; Ko Yamashita, Chiba; Koichi Okisaka, Ibaraki; Yoshito Sano, Chiba; Hisao Omura, Ibaraki; Yuuichi Irinatsu, Ibaraki; Kenji Masui, Ibaraki; Takeshi Yasumasu, Ibaraki, all of Japan

[73] Assignee: Kao Corporation, Tokyo, Japan

[21] Appl. No.: 824,866

[22] Filed: Jan. 22, 1992

Related U.S. Application Data

[63] Continuation of Ser. No. 532,755, Jun. 4, 1990, abandoned.

[30] Foreign Application Priority Data

| Jun. 7, 1989 | [JP] | Japan | 1-144351 |
| Sep. 1, 1989 | [JP] | Japan | 1-226843 |
| Sep. 1, 1989 | [JP] | Japan | 1-226844 |

[51] Int. Cl.$^5$ ............................................. A23D 7/00
[52] U.S. Cl. .................................. 426/602; 426/604; 426/605; 426/611; 426/613; 426/531
[58] Field of Search ............... 426/601, 602, 603, 604, 426/605, 607, 609, 613, 611, 531

[56] References Cited

U.S. PATENT DOCUMENTS

| 3,652,397 | 3/1972 | Pardun | 426/605 |
| 4,199,608 | 4/1980 | Gilmore et al. | 426/613 |
| 4,861,610 | 8/1989 | Kato et al. | 426/602 |
| 4,943,389 | 7/1990 | Weete et al. | 426/662 |
| 4,971,826 | 11/1990 | Kato et al. | 426/602 |
| 4,976,984 | 12/1990 | Yasukawa et al. | 426/602 |

FOREIGN PATENT DOCUMENTS

| 0075463 | 3/1983 | European Pat. Off. |
| 0171112 | 7/1985 | European Pat. Off. |
| 62-239950 | 4/1988 | Japan |
| 63-301743 | 4/1989 | Japan |
| 63-301765 | 4/1989 | Japan |
| 1350065 | 4/1974 | United Kingdom |

Primary Examiner—Joseph Golian
Assistant Examiner—Evan Federman
Attorney, Agent, or Firm—Birch, Stewart, Kolasch & Birch

[57] ABSTRACT

An oil-in-water emulsion comprises an aqueous phase of water and an oil phase comprising an edible oil composition comprising 10 to 99 percent by weight, based on the entire oils and fats of the emulsion, of a diglyceride mixture containing the diglycerides having an increasing melting point of 20 degree centigrade or less. It may be mixed with a protein, lecithin or phospholipid.

5 Claims, No Drawings

EDIBLE OIL-IN-WATER EMULSION

This application is a continuation of application Ser. No. 532,755, filed on Jun. 4, 1990, now abandoned.

The present invention relates to an oil-in-water emulsion composition which exhibits a rich fatty savor even at a lowered fat content.

Particularly, it relates to an oil-in-water emulsion composition which exhibits a rich fatty savor even at a lowered fat content and which is suitable for creams such as cream for coffee, whip cream or ice cream, condiments such as dressing or mayonnaise and drinks.

BACKGROUND OF THE INVENTION

Recently, attempts to reduce the content of oils and fats in emulsion food such as cream or dressing have been made to meet the request of users for low-calorie food. However, a mere reduction in the content of fats and oils in emulsion food causes the resulting emulsion food to lose its inherent rich fatty savor, thus deteriorating its flavor. This is particularly true if the emulsion food is a cream for coffee as the coffee-mildening effect is unfavorably lowered.

In order to solve the disadvantages described above, there has been proposed, for example, a process comprising the use of a thickening agent and a process comprising the employment of multi-phase emulsification such as double emulsification. Although the former process is characterized in that the reduction in the content of fats and oils in emulsion food is compensated for by the addition of a thickening agent, such as gum to enhance the viscosity of the food and thereby retaining the inherent rich fatty savor, the addition of a thickening agent deteriorates the taste and flavor of the emulsion food. On the other hand, the double emulsification method as disclosed in, e.g., Japanese Patent Laid-Open Nos. 169531/1984, 16542/1985, 102137/1985, 184366/1985, 175137/1987, and 22142/1988 is characterized in that the apparent content of fats and oils in an oil-in-water emulsion is enhanced by dispersing another aqueous phase in the oil droplets to thereby retain the inherent rich fatty savor. However, this method is problematic in that the preparation of the emulsion is complicated and that the obtained emulsion is not sufficiently stable, particularly when the emulsion is a high-viscosity one such as mayonnaise.

JP-A 63-301743 discloses a water-in-oil emulsion comprising in the oil phase an edible oil composition comprising 10 to 99 percent by weight, based on the entire oils and fats of the emulsion, of a diglyceride mixture having an increasing melting point of 20 degree centigrade or less. JP-A 63-301765 discloses a highly foamable oil and fat composition comprising an edible oil composition comprising 10 to 99 percent by weight, based on the entire oils and fats of the emulsion, of a diglyceride mixture having an increasing melting point of 20 degree centigrade or below.

SUMMARY OF THE INVENTION

Under these circumstances, the inventors of the present invention have intensively studied to obtain an oil-in-water emulsion which exhibits a rich fatty savor even at a lowered fat content and which is easily preparable. The inventors have found that an oil-in-water emulsion characterized in that the oil phase is composed of a glyceride mixture containing diglycerides in a specified amount exhibits a remarkably rich fatty savor. The present invention has been accomplished on the basis of this finding.

The oil-in-water emulsion of the invention comprises an aqueous phase of water and an oil phase comprising an edible oil composition comprising 10 to 99 percent by weight, based on the entire oils and fats of the emulsion, of a diglyceride mixture containing the diglycerides having an increasing melting point of 20 degrees centigrade or less.

The invention provides the following five embodiments:

(1) In the diglyceride mixture, 70 percent by weight or more of the fatty acid moiety is unsaturated fatty acids having 16 to 22 carbon atoms.

(2) The glyceride mixture contained in the oil phase comprises diglycerides in an amount of from more than 30 percent by weight to 100 percent by weight, monoglycerides in a weight ratio of 0 to 1/20 based on the diglycerides and the balance of triglycerides and the glyceride mixture has a melting point of 35 degree centigrade or below.

(3) The emulsion further comprises 0.1 percent by weight or more of a protein in the agueous phase.

(4) The emulsion further comprises, in the oil phase, 0.1 to 10 percent by weight, based on the oil phase, of phospholipids in which a weight ratio of the nitrogen-free phospholipides to nitrogen-containing phospholipids is 1.0 or more.

(5) The emulsion further comprises, in the oil phase, 0.1 to 10 percent by weight, based on the entire oil and fat of the oil phase, of lecithin and 0.1 percent by weight or more, based on the aqueous phase, of a protein, said emulsion comprising 20 to 90 percent by weight, based on the entire oil and fat of the oil phase, of the diglycerides, a weight ratio of the oil phase to the aqueous phase ranging from 10/90 to 80/20.

The invention will be below explained in details in reference to the above shown embodiments (1) to (5).

DETAILED DESCRIPTION OF THE INVENTION

Embodiment (1)

In the invention, the edible oil composition comprises 10 to 99 percent by weight, based on the entire oils and fats of the emulsion, of a diglyceride mixture containing the diglycerides having an increasing melting point of 20 degrees centigrade or less. The diglycerides has a preferable increasing melting point of minus 20 to plus 15 degree centigrade, more preferably from −5 degree to +15 degree C. They preferably contain unsaturated fatty acid moieties having 16 to 22 carbon atoms in an amount of 70 percent by weight or larger, more preferably 80 or more, based on the entire fatty acid moieties of the diglycerides. In particular di-cis-unsaturated diglycerides are preferable in an amount of 50 percent or more, more preferably 70 or more.

They may be mixed with another edible plastic oil to obtain the edible oil composition. The composition is preferred to have an oil solide profile expressed by N10=60, N20=5−40, N30=0−20, N35=0−10, which are percent of solid fat, determine by NMR at the respective temperatures. The profile is expressed in view of N value at respective temperatures, for example 10 degree to 35 degree C. and shows percents of fat crystals. It is determined according to "Fat Analysis standard test method of Japan Oil Chemistry Association".

It is preferable that the composition contains less than 10 percent of monoglycerides to prevent gel, more preferable from zero to 5 percent.

Embodiment (2)

Namely, the present invention provides an oil-in-water emulsion composition excellent in a rich fatty savor, which is characterized in that the oil phase of said emulsion is composed of a glyceride mixture which comprises diglycerides in an amount exceeding 30% by weight and up to 100% by weight, monoglycerides in a weight ratio of 0 to 1/20 based on the diglycerides and the balance of triglycerides and which has a melting point of 35° C. or below.

The present invention will now be described in more detail.

The formulation of the emulsion composition according to the present invention will first be described.

The glyceride mixture constituting the oil phase of the emulsion composition according to the present invention is a mixture which comprises diglycerides in an amount exceeding 30% by weight and up to 100% by weight, monoglycerides in a weight ratio of 0 to 1/20 based on the diglycerides and the balance of triglycerides and has a melting point of 35° C. or below. It is preferable that the fatty acid residue of each of the glycerides have a number of carbon atoms of 8 to 24, still preferably 16 to 22.

The diglyceride content of the glyceride mixture must exceed 30% by weight and be up to 100% by weight, preferably 40 to 80% by weight. Within this diglyceride content, a higher diglyceride content brings about a richer fatty savor. If the diglyceride content is 30% by weight or below, the fatty savor of the resulting emulsion will be too poor to exhibit a fatty savor at a lowered content of fats and oils.

The weight ratio of the monoglycerides to the diglycerides in the glyceride mixture must be 0 to 1/20, preferably 0 to 1/30. If the weight ratio exceeds 1/20, the effect of the emulsifying agent to be added to the aqueous phase in the preparation of the oil-in-water emulsion will be lowered and the flavor of the obtained emulsion will be deteriorated.

The favorable melting point of the glyceride mixture constituting the oil phase of the emulsion composition according to the present invention varies depending upon the objective article, so that it is impossible to specify it in general. For example, with respect to creams such as cream for coffee or whip cream, it is preferable that the mixture be partially crystallized at an ambient temperature (5 to 30° C.) and melted at an oral cavity temperature (35° to 37° C.), i.e., that the mixture have a melting point of 35° C. or below, preferably 30° C. or below. On the other hand, with respect to emulsions generally prepared from liquid oil, such as dressing or mayonnaise, it is preferred that the glyceride mixture have such a low melting point as to cause neither crystallization nor solidification even when stored in a low-temperature place, e.g., in a refrigerator. In order to obtain a glyceride mixture having such a low melting point, it is preferred that the following requirements be satisfied: the fatty acid residue of each of the glycerides has a number of carbon atoms of 8 to 24; the content of unsaturated fatty acid residues is at least 70% by weight based on the total fatty acid residues; and the diglyceride comprises at most 40% by weight (still preferably 0.1 to 40% by weight) of a diglyceride characterized in that one of the fatty acid residues is a saturated one and the other thereof is an unsaturated one, at most 5% by weight (still preferably 0 to 1% by weight) of a diglyceride characterized in that both of the fatty acid residues are saturated ones and the balance of a diglyceride characterized in that both of the fatty acid residues are unsaturated ones.

The glyceride mixture to be used in the emulsion composition according to the present inveniton can be prepared by the transesterification between glycerin and one or more fats and/or oils selected from among vegetable oils such as safflower, olive, cottonseed, rapeseed, corn, soybean, palm, rice bran, sunflower and sesame oils; animal fats and oils such as hog fat lard, beef tallow, fish oil and butter; and oils and fats prepared by the fractionation, randomization, hardening or transesterification of these vegetable and animal fats and oils, or by the esterification of glycerin with a mixture comprising fatty acids originating from the above fats and oils. The transesterification or esterification may be carried out by either a chemical process characterized by employing a high temperature and/or an alkali metal or alkaline earth metal compound catalyst, or an enzymatic process. The glyceride mixture prepared by the above reaction can be freed from excess monoglycerides by molecular distillation or chromatography. As described above, the presence of too much monoglycerides deteriorates the emulsifiability of the glyceride mixture and the flavor of the final product.

Alternatively, the glyceride mixture to be used in the emulsion composition according to the present invention may be prepared by adding one or more fats and/or oils selected from among vegetable oils such as safflower, olive, cottonseed, rapeseed, corn, soybean, palm, rice bran, sunflower and sesame oils; animal fats and oils such as hog fat lard, beef tallow, fish oil and butter; and fats and oils prepared by the fractionation, randomization, hardening or transesterification of these vegetable and animal fats and oils to the glyceride mixture which has been prepared by the transesterification or esterification as described above and, if necessary, has been freed from excess monoglycerides by molecular distillation or chromatography.

The oil phase of the emulsion composition according to the present invention may further contain seasoning, flavoring material, colorant or stabilizer in a dispersed or dissolved state depending upon the object.

The aqueous phase of the emulsion composition according to the present invention is not different from that of the oil-in-water emulsion according to the prior art at all and is composed of water, seasoning, flavoring material, emulsifying agent, stabilizer, colorant and so on. The emulsifying agent and stabilizer to be used in the emulsion composition according to the present invention may be each conventional one, and examples thereof include hydrophilic emulsifying agents such as sucrose fatty acid ester, sorbitan fatty acid ester and polyglycerin fatty acid ester; proteins, conjugated proteins and decomposition products thereof such as powdered milk, sodium caseinate, decomposition products of casein, soybean protein and decomposition products thereof, wheat protein, milk serum protein, glycoprotein, egg and egg yolk; and high-molecular polysaccharides such as starch and hydrolysate thereof, dextrin and gum. The aqueous phase of the emulsion composition according to the present invention may further contain a seasoning such as salt, sugar, vinegar, fruit juice, organic acid or salt thereof; a flavoring material such as spice oil or flavor and/or a colorant depending upon the object.

Up to this time, the use of a thickening agent and the employment of multiple emulsification have been attempted to attain a rich fatty savor even at a lowered content of fats and oils. However, these means have various disadvantages such as the deterioration of the flavor, the lowering of the stability of the emulsion food, the complication of the preparation thereof and so on.

On the contrary, the oil-in-water emulsion composition according to the present invention is characterized in that the oil phase of the emulsion is composed of a glyceride mixture which comprises diglycerides in an amount exceeding 30% by weight and up to 100% by weight, monoglycerides in a weight ratio of 0 to 1/20 based on the diglycerides and the balance of triglycerides and which has a melting point of 35° C. or below, whereby the emulsion can exhibit a rich fatty savor even at a lowered content of fats and oils. Further, the form of the emulsion of the present invention and the basic ingredients of the aqueous phase are similar to those of the prior art, so that the preparation thereof is very easy.

According to the present invention, it is possible to easily prepared an emulsion food which exhibits a rich fatty savor even at a lowered content of fats and oils, examples of the emulsion food including creams such as cream for coffee, whip cream and ice cream; emulsion condiments such as dressing and mayonnaise; and drinks.

Embodiment (3)

The emulsion which comprises the oil phase comprising 5 to 90 percent by weight, based on the entire oil and fat in the oil phase, of the diglycerides having an increasing melting point of 20 degree C or lower higher and the aqueous phase comprising 0.1 percent by weight or more, preferably from 0.2 to 30 percent by weight, of a protein. This provides a compound cream very like a natural cream. The emulsion preferably has a weight ratio of the oil phase to the aqueous phase in the range between 10/90 and 80/20, more preferably 10/90 and 70/30. The protein preferably includes egg protein, milk protein, soy bean protein, wheat protein, a mixture of these protein and decomposition products thereof.

The emulsion may contain 0.1 percent by weight or more, preferably from 0.5 to 50, of a milk ingredient(s), such as natural milk, fat-free milk, powder milk, milk fat, decanted milk, natural cream, cheese, yogult, butter and butter milk. It may contains additives such as flavors, seasoners, emulsifiers, stabilizers, sweeter and tasters.

Embodiment (4)

Accordingly, the present invention provides a highly safe oil-in-water emulsion composition comprising 0.1 to 10% by weight of a phospholipid mixture, which comprises nitrogen atom-free phospholipid(s) at a weight ratio to nitrogen atom-containing phospholipid(s) of 1.0 or above, as at least one emulsifier component in the oily phase. The present invention further provides the above-mentioned oil-in-water emulsion composition which comprises 0.1 to 80% by weight of one or more diglycerides in the oily phase.

Now the present invention will be described in detail.

The oil-in-water emulsion composition of the present invention comprises a phospholipid mixture of a specific composition. More particularly, it comprises an oily phase containing diglyceride(s) together with a watery phase to be blended and emulsified therewith which optionally containing flavors and the like.

In the phospholipid mixture to be used in the oil-in-water emulsion composition of the present invention, the contents of phosphatidylcholine and phosphatidylethanolamine are lowered so as to give a weight ratio of nitrogen atom-free phospholipid(s) to nitrogen atom-containing phospholipid(s) of 1.0 or above. The oil-in-water emulsion composition of the present invention may comprise 0.1 to 10% by weight, preferably 0.2 to 10% by weight and still preferably 0.5 to 7% by weight, of said phospholipid mixture.

Examples of the phospholipid mixture available in the present invention, wherein the contents of the nitrogen atom-containing phospholipids such as phosphatidylcholine or phosphatidylethanolamine are lowered, include phospholipid mixtures containing phosphatidic acid(s) or/and salt(s) thereof, phosphatidylinositol, phosphatidylglycerol and lysophospholipids thereof. In the present invention, it is particularly preferable to use a phospholipid mixture which comprises 15% by weight or more, based on the total phospholipids, of phosphatidic acid(s) or/and salt(s) thereof.

Examples of the phosphatidic acids to be used in the present invention include those represented by the following general formula (I) and/or (II):

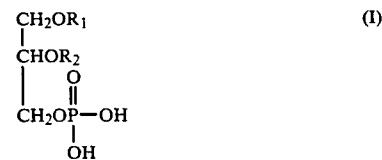

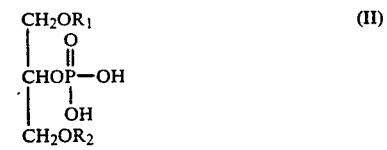

wherein $R_1$ and $R_2$ may be either the same or different from each other and each represents a saturated or unsaturated aliphatic acyl group having 8 to 24 carbon atoms.

Examples of the salts of phosphatidic acids include sodium, potassium, calcium, aluminum, magnesium and ammonium phosphatidates. Further, the phosphatidic acid(s) or/and salt(s) thereof may contain lysophosphatidic acid(s) or/and the above-mentioned salts thereof.

The above-mentioned phospholipid mixture comprising nitrogen atom-free phospholipid(s) at a weight ratio to the nitrogen atom-containing phospholipid(s) of 1.0 or above may be obtained by, for example, treating a natural lecithin material with an enzyme (phospholipase D) or fractionating the same to thereby lower the contents of phosphatidylcholine and phosphatidylethanolamine therein and instead increase the contents of phosphatidic acid(s) and phosphatidylinositol therein above a specific level. Examples of the natural lecithin to be used here include those derived from plants such as soybean, rapeseed, sunflower or corn and those derived from animals such as yolk.

The above-mentioned phospholipid mixture may be further subjected to various treatments such as solvent fractionation, ion-exchange column chromatography, fractionation with the use of a silicate column or electrodialysis.

In addition to the enzymatically treated phospholipids, synthetic ones, for example, those obtained by treating mono- or diglycerides with a phosphating agent such as phosphorus pentaoxide, phosphorus pentachloride or phosphorus oxychloride may be similarly used in the present invention.

When the weight ratio of the nitrogen atom-free phospholipid(s) to the nitrogen atom-containing phospholipid(s) in the phospholipid mixture to be used in the present invention is smaller than 1.0 and the content of the above-mentioned phospholipid mixture of the specific composition in the oil-in-water emulsion composition of the present invention is smaller than 0.1% by weight of the oily phase, only a limited emulsification stabilizing effect is obtained and thus the objects of the present invention cannot be achieved. The emulsification stabilizing effect increases with an increase in the content of said phospholipid mixture, wherein the weight ratio of the nitrogen atom-free phospholipid(s) to the nitrogen atom-containing phospholipid(s) is 1.0 or above, in the oily phase. When the content of said phospholipid mixture reaches approximately 10% by weight, however, an equilibrium is established and no significant improvement in the effect can be expected any more.

The emulsification stabilizing effect can be extremely elevated by adding one or more diglycerides to the oily phase of the oil-in-water emulsion composition of the present invention. The content of the diglyceride(s) in the oily phase may range from 0.1 to 80% by weight, preferably from 2 to 60% by weight. Although the effect of the addition of the diglyceride(s) would increase with an increase in the diglyceride content in the oily phase, the increase in said effect becomes smaller when the diglyceride content exceeds approximately 60% by weight and no increase therein can be expected when said content exceeds 80% by weight.

It is preferable that the diglycerides to be used in the oil-in-water emulsion composition of the present invention be present in liquid form under the temperature conditions for the storage and use of the emulsion composition. It is preferable to use one or more diglycerides consisting of 70% by weight or more, based on the total fatty acid residues, of unsaturated fatty acid residues and having 8 to 24, preferably 16 to 22 carbon atoms. These diglycerides may be preferably obtained from fats or oils containing large amounts of unsaturated fatty acids, for example, rapeseed oil, corn oil and soybean oil.

The oily phase to watery phase ratio (by weight) of the oil-in-water emulsion composition of the present invention may preferably range from 10/90 to 80/20. In order to further improve the stability of the emulsion composition, the watery phase may contain one or more components selected from among proteins and conjugated proteins such as albumen, yolk, powdery milk, egg proteins such as casein, milk protein, soybean protein and wheat protein and hydrolyzates thereof and emulsifiers such as sucrose fatty acid esters, sorbitan fatty acid esters and polyglycerol fatty acid esters. From the viewpoints of the stabilizing effect, safety and taste, it is preferable to add the above-mentioned proteins, conjugated proteins and hydrolyzates thereof to the watery phase. The watery phase of the oil-in-water emulsion composition of the present invention may furthermore contain various additives such as seasonings and perfumes (common salt, sugar, vinegar etc.), colorants and stabilizers.

The oil-in-water emulsion composition of the present invention has a prolonged storage stability and a high temperature resistance extremely improved by adding a specific amount of a specific phospholipid composition to the oily phase.

Furthermore, the emulsification stability of the oil-in-water emulsion composition of the present invention increases with an increase in the diglyceride content in the oily phase.

Embodiment (5)

Accordingly, the present invention provides an oil-in-water emulsion having a weight ratio of an oily phase to a watery phase of from 10/90 to 80/20, which contains 0.1 to 10% by weight, based on the total oil(s) and/or fat(s), of lecithin and 20 to 90% by weight of one or more diglycerides in the oily phase and 0.1% by weight or more of protein(s) in the watery phase, shows a high emulsification stability and gives a rich fatty taste.

Now the present invention will be described in detail.

The oil-in-water emulsion of the present invention may be obtained by mixing an oily phase comprising fat(s) and/or oil(s) containing lecithin and diglyceride(s), each in a specific amount, with a watery phase containing an at least specific amount of protein(s) at a weight ratio of 10/90 to 80/20 and emulsifying the mixture thus obtained.

The lecithin to be used in the emulsion composition of the present invention is a phospholipid mixture comprising phosphatidylcholine, phosphatidylethanolamine, phosphatidylinositol and phosphatidic acids, and typical examples thereof include lecithin obtained from soybean or yolk.

The content of the lecithin in the oily phase may range from 0.1 to 10% by weight, preferably from 0.5 to 7% by weight, based on the total fat(s) and/or oil(s). When the lecithin content is smaller than 0.1% by weight, only a limited emulsification stabilizing effect is obtained, thus failing in attaining the objects of the present invention. Although the emulsification stabilizing effect increases with an increase in the lecithin content, an equilibrium is established when the lecithin content reaches approximately 10% by weight, based on the total fat(s) and oil(s), so that no significant improvement in the effect can be expected any longer.

The lecithin content is expressed in terms of the acetone insoluble content, which specifies the amount of pure lecithin according to the Japanese Standard of Food Additives.

The content of the diglycerides in the oily phase of the oil-in-water emulsion of the present invention may range from 20 to 90% by weight, preferably from 30 to 80% by weight, based on the total fat(s) and/or oil(s) in the oily phase. The stability and rich fatty taste of the emulsion would increase with an increase in the diglyceride content. When the diglyceride content reached approximately 70% by weight, however, the increase becomes smaller. When it exceeds 90% by weight, no more improvement can be expected any longer.

It is preferable that the diglycerides to be used in the oil-in-water emulsion of the present invention be present in liquid form under the temperature conditions for the storage and use of the emulsion. It is preferable to use one or more diglycerides consisting of 70% by weight or more, based on the total fatty acid residues, of unsaturated fatty acid residues and having 8 to 24, preferably 16 to 22 carbon atoms. These diglycerides may be preferably obtained from fats or oils containing large amounts of unsaturated fatty acids, for example, rapeseed oil, corn oil and soybean oil.

In the oil-in-water emulsion of the present invention, the watery phase may amount to 20 to 90% by weight. Namely, the oily phase to watery phase ratio (by weight) of the oil-in-water emulsion of the present invention may preferably range from 10/90 to 80/20. The watery phase contains 0.1% by weight or more, preferably 0.5 to 30% by weight, of one or more proteins selected from among egg protein, milk protein, soybean protein, wheat protein, conjugated proteins and hydrolyzates thereof. When the protein content in the watery phase is smaller than 0.1% by weight, the mixture would cause inversion or separation between the oily phase and the watery phase during the emulsification process, which makes it difficult to prepare an emulsion.

In order to further improve the emulsification stability of the emulsion, the watery phase may contain one or more components selected from among emulsifiers such as sucrose fatty acid esters and polyglycerol fatty acid esters and high-molecular polysaccharides such as gum arabic, xanthan gum, carrageenan, locust bean gum, tamarind gum, starch, gelatinized starch or pectin. The watery phase of the oil-in-water emulsion of the present invention may furthermore contain various additives such as seasonings and perfumes (common salt, sugar, vinegar etc.), colorants and stabilizers.

In the oil-in-water emulsion of the present invention wherein lecithin is used as an emulsifier, the use of fat(s) and/or oil(s) containing a specific amount of diglyceride(s) as an oily phase and protein(s) as one of the components of a watery phase makes it possible to extremely elevate the stability of the emulsion and give a rich fatty taste. In the oil-in-water emulsion of the present invention, furthermore, lecithin is neither chemically nor enzymatically modified but used in a natural form. Thus an emulsion can be easily produced, which makes the oil-in-water emulsion highly suitable and useful as an edible emulsion.

Preparation of glyceride mixtures

The glyceride mixtures 1 to 4 listed in Table 1 were prepared as follows.

0.1 part (by weight; the same applies hereinafter) of calcium hydroxide was added to a mixture comprising 75 parts of fat or oil originating from natural sources and 25 parts of glycerin to carry out transesterification. The reaction mixture was subjected to molecular distillation to remove monoglycerides. Thus, glyceride mixtures 1 to 4 were obtained.

The composition, iodine number and melting point of each of these mixtures are given in Table 1.

TABLE 1

| Mixture No. Origin of fat or oil | Glyceride mixtures | | | |
|---|---|---|---|---|
| | Mix. 1 rapeseed oil | Mix. 2 fractionated palm oil (I.V.: 62)/ rapeseed oil = 4/6 (by weight) | Mix. 3 partially hardened rapeseed oil | Mix. 4 corn coil |
| Composition[1] | | | | |
| triglyceride | 19 | 21 | 23 | 29 |
| diglyceride | 79 | 77 | 74 | 70 |

TABLE 1-continued

| Mixture No. Origin of fat or oil | Glyceride mixtures | | | |
|---|---|---|---|---|
| | Mix. 1 rapeseed oil | Mix. 2 fractionated palm oil (I.V.: 62)/ rapeseed oil = 4/6 (by weight) | Mix. 3 partially hardened rapeseed oil | Mix. 4 corn coil |
| monoglyceride | 2 | 2 | 3 | 1 |
| Iodine value (I.V.) | 118 | 96 | 80 | 121 |
| Melting point[2] (°C.) | 8.2 | 14.8 | 32.7 | 2.3 |

Note)
[1]analyzed by gas chromatography and represented by percentages.
[2]point according to the Standard Analytical Methods for Fats and Oils

TEST EXAMPLE 1

Defatted milk powder, sodium caseinate and polyglycerin fatty acid ester (a product of Sakamoto Yakuhin K.K., MS-750) were dispersed or dissolved in water in amounts of 10, 4 and 0.6% by weight, respectively based on the aqueous phase to prepare an aqueous phase. 40 to 10 parts (variable) of glyceride mixture 1 listed in Table 1 or refined rapeseed oil as an oil phase was added to 60 to 90 parts (variable) of the above aqueous phase under stirring at 60° C. After the addition of the oil phase, the obtained mixture was stirred with a homomixer at 8000 rpm at 60° C. for 10 minutes to carry out preliminary emulsification. The resulting mixture was homogenized with a homogenizer to 60° C. with 150 kg/cm². The obtained emulsion was immediately cooled to 5° C. under stirring to give an oil-in-water emulsion.

Several emulsions were prepared by varying the fat or oil to be used and the proportions of the oil and aqueous phases and evaluated for a fatty savor and the effect of mildening the taste of coffee such as bitterness. The results are given in Table 2.

The evaluation of the effect on coffee was carried out as follows:

| evaluation of the effect on coffee | | |
|---|---|---|
| test coffee | commerically available instant coffee | 3 g |
| | hot water | 120 cc |
| | amount of the emulsion added | 5 cc |
| | test temperature | 80° C. |
| Evaluation criteria | | |
| effect of mildening the bitter or sour taste of coffee: | | |
| ○: very effective | | |
| ×: ineffective | | |

TABLE 2

| | Fatty savor and coffee-mildening effect of the emulsion | | | |
|---|---|---|---|---|
| Kind of oil or fat used as oil phase | Proportions[1] | | Fatty savor[2] | Coffee-mildening effect |
| | oil phase | aqueous phase | | |
| Glyceride mixture 1 originating from rapeseed oil | 40 | 60 | ○ | ○ |
| | 20 | 80 | ○ | ○ |
| | 10 | 90 | ○ | ○ |
| Refined rapeseed oil | 40 | 60 | × | × |
| | 20 | 80 | × | × |

TABLE 2-continued

| | Fatty savor and coffee-mildening effect of the emulsion | | | |
|---|---|---|---|---|
| | Proportions[1] | | | Coffee-mildening effect |
| Kind of oil or fat used as oil phase | oil phase | aqueous phase | Fatty savor[2] | |
| | 10 | 90 | × | × |

Note)
[1]The proportions of oil and aqueous phase are given by weight.
[2]Criteria for evaluating the fatty savor of emulsion:
○ : very rich in fatty savor
×: poor in fatty savor As shown in Table 2, when the oil phase proportion is constant, the emulsion prepared by using glyceride mixture 1 containing 79% of diglycerides exhibits a richer fatty savor and a higher coffee-mildening effect than those of the emulsion prepared by using refined rapeseed oil containing triglycerides as a main component. Further, the emulsion prepared by using glyceride mixture 1 exhibits a rich fatty savor and an excellent coffee-mildening effect even at a low oil phase proportion.

TEST EXAMPLE 2

The glyceride mixture 2 listed in Table 1 was mixed with refined rapeseed oil at various weight ratios between 100 : 0 and 0 : 100 to prepare various oil phases. 25 parts of each of the oil phases was added under stirring to 75 parts of an aqueous phase containing 7 parts of defatted milk powder, 3 parts of sodium caseinate and 0.5 part of polyglycerin fatty acid ester (a product of Sakamoto Yakuhin K.K., MS 750) dispersed or dissolved therein. The obtained mixture was preliminarily emulsified at 60° C. with a homomixer at 8000 rpm for 10 minutes and homogenized with a homogenizer at 60° C. with 150 kg/cm². The homogenized emulsion was immediately cooled to 50° C. under stirring to give an oil-in-water emulsion.

The obtained emulsions having various weight ratios of glyceride mixture 2 to refined rapeseed oil were evaluated for fatty savor and coffee-mildening effect. The results are given in Table 3. The evaluation was carried out in a similar manner to that of Test Example 1.

TABLE 3

| | | Fatty savor and coffee-mildening effect of emulsion | | | | |
|---|---|---|---|---|---|---|
| Content of glyceride mixture 2 in oil phase (% by wt.) | Content of refined rapeseed oil in oil phase (% by wt.) | Composition (%)[1] | | | Fatty savor | Coffee mildening effect |
| | | tri-glyceride | di-glyceride | mono-glyceride | | |
| 100 | 0 | 21 | 77 | 2 | ○ | ○ |
| 80 | 20 | 36 | 62 | 2 | ○ | ○ |
| 60 | 40 | 52 | 47 | 1 | ○ | ○ |
| 40 | 60 | 68 | 31 | 1 | ○ | ○ |
| 20 | 80 | 85 | 15 | 0 | × | × |
| 0 | 100 | 99 | 1 | 0 | × | × |

Note)
[1]analyzed by gas chromatography and represented by percentages

It is apparent from the results of Table 3 that the emulsions wherein the diglyceride content of the oil phase exceeds 30% by weight exhibit a rich fatty savor and a remarkable coffee-mildening effect.

EXAMPLE 1

Glyceride mixture 3 listed in Table 1 as an oil phase was added to 75 parts of an aqueous phase containing 7 parts of defatted milk powder, 3 parts of sodium caseinate and 0.5 part of polyglycerin fatty acid ester (a product of Sakamoto Yakuhin K.K., MS-750) dispersed or dissolved therein under stirring at 60 ° C. The obtained mixture was preliminarily emulsified with a homomixer at 8000 rpm at 60° C. for 10 minutes and homogenized with a homogenizer at 60° C. with 150 kg/cm². The homogenized emulsion was immediately cooled to 5° C. to give an oil-in-water emulsion.

This emulsion exhibited a richer fatty savor and a higher coffee-mildening effect than those of an emulsion having the same composition as the one described above except that partially hardened rapeseed oil (I.V. : 73) was used as the oil phase.

EXAMPLE 2

0.1 part of xanthan gum was dispersed in 30 parts of water. The obtained dispersion was heated to 60° C. to prepare a homogeneous solution. 2 parts of common salt and 1 part of refined sugar were dissolved in the solution, and the obtained solution was cooled to room temperature. 20 parts of brewed vinegar, 5 parts of egg yolk and 0.7 part of a seasoning and/or a spice were added to the above aqueous solution. The obtained mixture was stirred to give an aqueous phase. 40 parts of glyceride mixture 4 listed in Table 1 was gradually added to the above aqueous phase, while stirring the aqueous phase with a homomixer. After the completion of the addition of glyceride mixture 4, the obtained mixture was emulsified and homogenized with a homomixer at 8000 rpm for 5 minutes to give an oil-in-water emulsion dressing.

This dressing exhibited a richer fatty savor than those of dressing each having the same composition as the one described above except that a salad oil such as rapeseed, soybean or corn oil was used as an oil component.

The glyceride mixtures falling into the embodiment (1) are shown below.

Glyceride mixtures 5, 6, 7 and 8

The glyceride mixtures 5, 6, 7 and 8 shown in Table 4 were obtained by mixing 75 parts of natural oil and fat with 25 parts of glycerin, adding 0.1 part of calcium hydroxide to the mixture to effect interesterification and purifying the reaction product by molecular distillation to obtain the intended diglyceride mixture. Data are available from gas chromatography.

TABLE 4

| starting oil & fat | diglyceride mixture | | | |
|---|---|---|---|---|
| | rape seed oil | rape seed oil | palm oil | completely hardened palm core oil |
| composition | | | | |
| triglycerides | 18 | 15 | 20 | 18 |
| diglycerides | 80 | 70 | 78 | 80 |
| monoglycerides | 2 | 15 | 2 | 2 |
| increasing m.p. of diglycerides (c) | 9.3 | 9.3 | 46.2 | 57.2 |
| unsaturated fatty acid moiety content in the entire fatty acid moiety of diglycerides | 94.2 | 93.7 | 50.2 | 1.0 |
| increasing m.p. of diglyceride mixture (c) | 9.1 | 10.1 | 45.0 | 56.3 |
| unsaturated diglyceride content of diglyceride mixture (c) | 75 | 68 | 20 | 0 |

Composition of the starting fats and oils are shown in Table 5.

TABLE 5

| | rape seed oil | palm oil | completely hardened palm core oil |
|---|---|---|---|
| $C_8$ | | | 2.2 |
| $C_{10}$ | | | 2.8 |
| $C_{12}$ | | trace of C12 or less | 49.1 |
| $C_{14}$ | trace of C14 or less | 1.0 | 15.1 |
| $C_{16=0}$ | 4.0 | 45.3 | 8.0 |
| $C_{16=1}$ | 0.5 | trace | trace |
| $C_{16=0}$ | 1.8 | 4.4 | 22.8 |
| $C_{18=1}$ | 59.8 | 40.3 | trace of C18 or larger |
| $C_{18=2}$ | 21.1 | 8.8 | |
| $C_{18=3}$ | 12.0 | 0.1 | |
| $C_{20=0}$ | 0.5 | 0.1 | |
| $C_{22}$ | trace of C22 or larger | trace of C22 or larger | |
| $C_{16-22}$ unsaturated | 93.4 | 49.2 | 1.0 |

The embodiment (4) is below exemplified.

REFERENTIAL EXAMPLE 1

Preparation of phospholipid sample

Soybean lecithin, which was employed as a starting material, was treated with phospholipase D to thereby give phospholipid mixtures [phospholipid samples (1) and (2)] wherein the contents of phosphatidylcholine and phosphatidylethanolamine were decreased while those of the nitrogen atom-free phospholipid (phosphatidylinositol, phosphatidic acids and calcium phosphatidates) were increased. Table 6 gives the phospholipid composition of each mixture.

For comparison, Table 6 also gives the phospholipid composition of soybean lecithin [comparative sample (1)] and that of comparative sample (2) prepared by treating the soybean lecithin with phospholipase A to thereby increase the content of monoacylphosphatides (lysolecithin).

TABLE 6

| | Composition of phospholipid mixture | | | | |
|---|---|---|---|---|---|
| | | Phospholipid sample | | Comparative phospholipid sample | |
| Sample No. | | (1) | (2) | (1) | (2) |
| acetone insoluble[1] | (%) | 96.8 | 96.2 | 95.9 | 97.1 |
| PC + LPC content[2] | (%) | 0.1 | 0.1 | 29.3 | 29.9 |
| PE + LPE content[3] | (%) | 10.5 | 0.3 | 21.1 | 20.7 |
| PI + LPI content[4] | (%) | 23.1 | 11.2 | 15.8 | 16.4 |
| PA + LPA content[5] | (%) | 31.0 | 56.2 | 11.8 | 11.3 |
| lysolecithin content[6] | (%) | 0.3 | 0.5 | 0.2 | 53.4 |

Note:
[1] acetone insoluble: lecithin component listed in the Japanese Standard of Food Additives.
[2] PC + LPC content: content (% by weight) of phosphatidylcholine and lysophosphatidylcholine in the acetone insoluble. Determined by TLC in accordance with Standard Method for Analyzing Fats and Oils (2.2.8.4a.86: Phospholipid phosphorus composition), ed. by the Japan Oil Chemists' Society.
[3] PE + LPE content: content (% by weight) of phosphatidylethanolamine and lysophosphatidylethanolamine in the acetone insoluble. Determined by TLC in the same manner as the one described in item [2].
[4] PI + LPI content: content (% by weight) of phosphatidylinositol and lysophosphatidyliniositol in the acetone insoluble. Determined by TLC in the same manner as the one described in item [2].
[5] PA + LPA content: content (% by weight) of phosphatidic acid and lysophosphatidic acid and calcium salts thereof in the acetone insoluble. Determined by TLC in the same manner as the one described in item [2].
[6] lysolecithin content: content (% by weight) of monoacylphosphatide (% by weight) in the acetone insoluble. Determined by TLC in the same manner as the one described in item [2].

Glyceride mixtures 9, 10 and 11 (fat samples 9, 10 11)

75 parts by weight of refined rapeseed oil was mixed with 25 parts by weight of glycerol, and 0.1 part by weight of calcium hydroxide was added thereto. The obtained mixture was subjected to transesterification in a conventional manner and the monoglycerides thus formed were removed by molecular distillation. The residue was purified to thereby give a transesterified oil containing 19.4% of triglycerides, 79.6% of diglycerides and 1.0% of monoglycerides.

The above-mentioned transesterified oil was blended with refined rapeseed oil at the ratios as specified in Table 2 to thereby prepare fat samples (9), (10) and (11). Table 7 gives the glyceride compositions of these fat samples and refined rapeseed oil.

TABLE 7

| Fat sample | Glyceride composition of fat sample | | | |
|---|---|---|---|---|
| | Fat sample (9) | Fat sample (10) | Fat sample (11) | Refined rapeseed oil |
| transesterified oil/refined rapeseed oil (by wt.) | 10/90 | 40/60 | 80/20 | 0/100 |
| glyceride composition[1] (%) triglyceride | 90.7 | 66.6 | 35.1 | 98.7 |
| diglyceride | 9.1 | 32.9 | 64.1 | 1.2 |
| monoglyceride | 0.2 | 0.5 | 0.8 | 0.1 |

Note:
[1] determimed by gas chromatography.

EXAMPLES 3 AND 4

The lecithin samples (1) and (2) prepared above were dissolved in 30 parts by weight of refined rapeseed oil at ratios of 0.2, 0.5, 1.0, 5.0 and 10% by weight, based on the refined rapeseed oil. Each oily phase thus obtained was added to 70 parts by weight of distilled water and the mixture was emulsified with a homomixer to thereby give oil-in-water emulsion compositions.

The emulsion compositions thus prepared was put into a graduated test tube and allowed to stand therein at 25° C. and 50° C. for 24 hours. Then the ratio of the emulsion phase to the whole solution phase was determined so as to evaluate the emulsification stability. Table 8 gives the results.

COMPARATIVE EXAMPLE 1

The comparative sample (1) (soybean lecithin) prepared above was dissolved in 30 parts by weight of refined rapeseed oil at ratios of 0.2, 0.5, 1.0, 5.0 and 10% by weight, based on the refined rapeseed oil. Each oily phase thus obtained was added to 70 parts by weight of distilled water and the mixture was emulsified with a homomixer to thereby give an oil-in-water emulsion composition.

The emulsification stability of the emulsion composition thus prepared was evaluated in the same manner as the one described in Examples 3 and 4. Table 8 gives the results.

COMPARATIVE EXAMPLE 2

The comparative lecithin sample (2) prepared above was dissolved in 30 parts by weight of refined rapeseed oil at ratios of 0.2, 0.5, 1.0, 5.0 and 10% by weight, based on the refined rapeseed oil. Each oily phase thus obtained was added to 70 parts by weight of distilled water and the mixture was emulsified with a homomixer to thereby give an oil-in-water emulsion composition.

The emulsification stability of the emulsion composition thus prepared was evaluated in the same manner as the one described in Examples 3 and 4. Table 8 gives the results.

TABLE 8

Evaluation of the emulisification stability of emulsion composition

| Phospholipid mixture blended | | Amount of phospholipid mixture (%; based on oil) | Emulsification stability[1] at | |
|---|---|---|---|---|
| | | | 20° C. | 50° C. |
| Ex. 3 | phospholipid sample (1) | 0.2 | 26.6 | 15.1 |
| | | 0.5 | 33.0 | 17.6 |
| | | 1.0 | 38.3 | 22.6 |
| | | 5.0 | 44.9 | 32.9 |
| | | 10 | 45.2 | 34.5 |
| Ex. 4 | phospholipid sample (2) | 0.2 | 43.1 | 26.7 |
| | | 0.5 | 48.0 | 30.4 |
| | | 1.0 | 53.8 | 39.3 |
| | | 5.0 | 60.6 | 49.5 |
| | | 10 | 61.4 | 50.4 |
| Comp. Ex. 1 | comparative phospholipid sample (1) | 0.2 | 2.1 | 1.3 |
| | | 0.5 | 3.9 | 3.0 |
| | | 1.0 | 5.2 | 3.8 |
| | | 5.0 | 6.0 | 5.2 |
| | | 10 | 6.7 | 5.2 |
| Comp. Ex. 2 | comparative phospholipid sample (2) | 0.2 | 5.1 | 2.2 |
| | | 0.5 | 6.9 | 3.4 |
| | | 1.0 | 9.0 | 5.5 |
| | | 5.0 | 11.5 | 7.1 |
| | | 10 | 11.8 | 7.7 |

Note:
[1] Emulsification stability: the ratio (% by volume) of the emulsion phase to the whole solution phase determined after allowing the prepared emulsion to stand at 20° C. or 50° C. for 24 hours.

EXAMPLE 5

An oil phase prepared by dissolving 1.0% by weight, based on the fat sample, of the phospholipid sample (2) in 30 parts by weight of each of the fat samples (9) to (11) listed in Table 7 was added to 70 parts of distilled water. Each mixture thus obtained was emulsified with a homomixer to thereby give an oil-in-water emulsion composition.

The emulsification stability of each oil-in-water emulsion composition thus obtained was evaluated in the same manner as the one described in Examples 3 and 4. Table 9 gives the results.

COMPARATIVE EXAMPLE 3

An oily phase prepared by dissolving 1.0% by weight, based on the fat sample, of the comparative phospholipid sample (1) in 30 parts by weight of each of the fat samples (9) to (11) listed in Table 7 was added to 70 parts of distilled water. Although each mixture thus obtained was emulsified with a homomixer, the mixture caused phase inversion, thus failing in giving a desired oil-in-water emulsion composition.

COMPARATIVE EXAMPLE 9

The comparative phospholipid sample (2) in an amount of 1.0% by weight, based on the fat sample to be used as an oily phase, was dissolved in 70 parts by weight of distilled water. The aqueous solution thus formed was mixed with 30 parts by weight of each of the fat samples (9) to (11). Each of the resulting mixtures was emulsified with a homomixer to thereby give an oil-in-water emulsion composition.

The emulsification stability of each oil-in-water emulsion composition thus prepared was evaluated in the same manner as the one described in Examples 3 and 4. Table 9 gives results.

TABLE 9

Evaluation of the emulisification stability of emulsion composition

| Phospholipid mixture blended | | fat sample | Emulsification stability[1] at | |
|---|---|---|---|---|
| | | | 20° C. | 50° C. |
| Ex. 5 | phospholipid sample (2) | fat sample (9) | 64.1 | 52.7 |
| | | fat sample (10) | 72.4 | 62.3 |
| | | fat sample (11) | 75.9 | 68.4 |
| Comp. Ex. 3 | comparative phospholipid sample (1) | fat sample (9) | —[2] | —[2] |
| | | fat sample (10) | —[2] | —[2] |
| | | fat sample (11) | —[2] | —[2] |
| Comp. Ex. 4 | comparative phospholipid sample (2) | fat sample (9) | 10.3 | 7.9 |
| | | fat sample (10) | 12.4 | 9.2 |
| | | fat sample (11) | 15.5 | 13.1 |

Note:
[1] emulsification stability: the ratio (% by volume) of the emulsion phase to the whole solution phase determined after allowing the prepared emulsion to stand at 20° C. or 50° C. for 24 hours.
[2] Phase inversion occurred during emulsification to make it impossible to prepare any oil-in-water emulsion composition.

The embodiment (5) is explained below.

EXAMPLES 6

Soybean lecithin (acetone insoluble content: 95.9%) was dissolved in the fat sample (9) prepared above at ratios of 0.2, 0.5, 1.0, 5.0 and 10% by weight, based on the fat sample. 30 parts by weight of each oily phase thus obtained was added to 70 parts by weight of an aqueous solution containing 0.5% by weight of egg albumin (watery phase) and the mixture was emulsified with a homomixer to thereby give an oil-in-water emulsion.

Each of the emulsions thus prepared was put into a graduated test tube and allowed to stand therein at 25° C. and 50° C. for 24 hours. Then the ratio of the emulsion phase to the whole solution phase was determined so as to evaluate the emulsification stability. Table 10 gives the results.

EXAMPLE 7

Oil-in-water emulsions were prepared in the same manner as the one described in Example 6 except that the fat sample (9) was replaced by the fat sample (10) to evaluate the emulsification stability of each oil-in-water emulsion thus obtained.

Table 10 gives the results.

TABLE 11

Evaluation of the emulsification stability of oil-in-water emulsion[1]

| Fat sample blended | | Amount of lecithin (% by wt.; based on fat sample) | Emulsification stability[2] at | |
|---|---|---|---|---|
| | | | 20° C. | 50° C. |
| Ex. 6 | fat sample (9) | 0.5 | 34.6 | 30.7 |
| | | 1.0 | 36.9 | 33.6 |
| | | 5.0 | 38.7 | 35.0 |
| | | 10 | 39.2 | 36.1 |
| Ex. 7 | fat sample (10) | 0.5 | 28.5 | 24.6 |
| | | 1.0 | 30.2 | 27.2 |
| | | 5.0 | 31.6 | 28.8 |
| | | 10 | 32.0 | 29.9 |

Note:
[1] oily phase/watery phase: 30/70 (by weight). water phase: aqueous solution containing 0.5% by weight of egg albumin.
[2] Emulsification stability: the ratio (% by volume) of the emulsion phase to the whole solution phase determined after allowing the prepared emulsion to stand at 20° C. or 50° C. for 24 hours.

EXAMPLE 8

An oily phase was prepared by dissolving 0.5, 1.0, 5.0 and 10% by weight, based on the fat sample, of soybean lecithin (acetone insoluble content: 95.9%) in the fat sample (9). 50 parts by weight of each oily phase thus obtained was added to 50 parts by weight of an aqueous solution containing 5% by weight of sodium caseinage (watery phase) and the resulting mixture was emulsified with a homomixer to thereby give an oil-in-water emulsion.

The emulsification stability of each emulsion thus obtained was evaluated in the same manner as the one described in Example 6. Table 12 gives the results.

EXAMPLE 9

Oil-in-water emulsions were prepared in the same manner as the one described in Example 8 except that the fat sample (9) was replaced by the fat sample (11) to evaluate the emulsification stability of each oil-in-water emulsion thus obtained.

Table 12 gives the results.

TABLE 12

Evaluation of the emulsification stability of oil-in-water emulsion[1]

| Fat sample blended | | Amount of lecithin (% by wt.; based on fat sample) | Emulsification stability[2] at | |
|---|---|---|---|---|
| | | | 20° C. | 50° C. |
| Ex. 8 | fat sample (9) | 0.5 | 73.4 | 68.5 |
| | | 1.0 | 76.8 | 73.3 |
| | | 5.0 | 80.2 | 77.9 |
| | | 10 | 80.0 | 78.7 |
| Ex. 9 | fat sample (10) | 0.5 | 63.9 | 55.6 |
| | | 1.0 | 67.4 | 61.0 |
| | | 5.0 | 69.4 | 63.6 |

TABLE 12-continued

Evaluation of the emulsification stability of oil-in-water emulsion[1]

| Fat sample blended | Amount of lecithin (% by wt.; based on fat sample) | Emulsification stability[2] at | |
|---|---|---|---|
| | | 20° C. | 50° C. |
| | 10 | 70.1 | 64.5 |

Note:
[1] oily phase/watery phase: 30/70 (by weight). water phase: aqueous solution containing 0.5% by weight of egg albumin.
[2] Emulsification stability: the ratio (% by volume) of the emulsion phase to the whole solution phase determined after allowing the prepared emulsion to stand at 20° C. or 50° C. for 24 hours.

The embodiment (3) is explained.

EXAMPLE 10

10 parts of hardened palm oil, 10 parts of hardened rape seed oil and 5 parts of milk fat were mixed with 15 parts of the fat sample (9). 0.2 part of fatty acid sucrose ester, 0.2 part of lecithin and 0.1 part of fatty acid monoglyceride to the mixture to obtain an oil component. 0.5 part of sodium casein, 3.5 parts of fat-free milk and 0.2 part of disodium phosphate were dissolved in 51 parts of purified water to obtain an aqueous component. At 75 degree C, the oil components and the aqueous components were mixed with each other, emulsified in the o/w form with a homomixer and then a homogenizer. The emulsion was stirred and cooled with ice and it was allowed to stand at 5 degree C for 24 hours. 90 parts of the emulsion was mixed with 10 parts of sugar at 5 degree C. The mixture was whipped to obtain a whipped cream.

EXAMPLE 11

Example 10 was followed except for using the fat sample (10).

EXAMPLE 12

Example 10 was followed except for using the fat sample (11).

TABLE 13

| | taste like milk | good body |
|---|---|---|
| example 10 | ⊚ | ⊚ |
| 11 | ⊚ | ⊚ |
| 12 | o | o |

The mark ⊚ shows having a very good taste of mil, and having a very good body. The mark o shows a good taste of milk and having a good body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An oil-in-water emulsion which comprises an aqueous phase of water and an oil phase comprising a glyceride mixture;
   wherein said glyceride mixture comprises 30% by weight to 100% by weight of a diglyceride mixture, monoglycerides present in a weight ratio to said diglyceride mixture of 0 to 1/20, and the balance being triglycerides; said glyceride mixture having a melting point of 35 degree centigrade or below; and wherein said oil phase comprises 10 to 99 percent by weight, based on the total weight of said oil phase, of a diglyceride mixture having an increasing melting point of 20 degree centigrade or less.

2. The emulsion as claimed in claim 1, in which in the diglyceride mixture 70 percent by weight or more of the fatty acid moiety is unsaturated fatty acids having 16 to 22 carbon atoms.

3. The emulsion as claimed in claim 1, which further comprises 0.1 percent by weight or more of a protein in the agueous phase.

4. The emulsion as claimed in claim 1, which further comprises, in the oil phase, 0.1 to 10 percent by weight, based on the oil phase, of phospholipids in which a weight ratio of the nitrogen-free phospholipides to nitrogen-containing phospholipids is 1.0 or more.

5. The emulsion as claimed in claim 1, which further comprises, in the oil phase, 0.1 to 10 percent by weight, based on the entire oil and fat of the oil phase, of lecithin and 0.1 percent by weight or more, based on the aqueous phase, of a protein, said emulsion comprising 20 to 90 percent by weight, based on the entire oil and fat of the oil phase, of the diglycerides, a weight ratio of the oil phase to the aqueous phase ranging from 10/90 to 80/20.

* * * * *